United States Patent
Dangoor et al.

(10) Patent No.: US 12,430,589 B2
(45) Date of Patent: Sep. 30, 2025

(54) CROSS-HIERARCHICAL MACHINE LEARNING PREDICTION

(71) Applicant: INTUIT INC., Mountain View, CA (US)

(72) Inventors: Sheer Dangoor, Ramat-Gan (IL); Daniel Ben David, Hod Hasharon (IL); Ido Meir Mintz, Tel Aviv (IL); Alexander Zhicharevich, Hod Hasharon (IL); Lior Tabori, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 281 days.

(21) Appl. No.: 17/869,780

(22) Filed: Jul. 20, 2022

(65) Prior Publication Data

US 2024/0028973 A1    Jan. 25, 2024

(51) Int. Cl.
G06N 20/20    (2019.01)

(52) U.S. Cl.
CPC .................. G06N 20/20 (2019.01)

(58) Field of Classification Search
CPC ............... G06N 20/20; G06Q 30/04
See application file for complete search history.

(56) References Cited

U.S. PATENT DOCUMENTS

| | | | | |
|---|---|---|---|---|
| 11,250,723 | B1 * | 2/2022 | Bayahya | A61B 3/032 |
| 2013/0253976 | A1 * | 9/2013 | Shukla | G06Q 10/107 |
| | | | | 705/7.26 |
| 2020/0065772 | A1 * | 2/2020 | Whitehead | G06N 20/00 |
| 2021/0103876 | A1 * | 4/2021 | Petrosso | G06F 18/24 |
| 2022/0336088 | A1 * | 10/2022 | Thomas | G16H 50/20 |
| 2023/0022268 | A1 | 1/2023 | Ben David et al. | |

OTHER PUBLICATIONS

Zhang, Yong, et al. "A weighted voting classifier based on differential evolution." Abstract and Applied Analysis. vol. 2014. Hindawi, 2014. (Year: 2014).*

Kaplowitz, Michael D., et al. "The effect of invitation design on web survey response rates." Social Science Computer Review 30.3 (2012): 339-349. (Year: 2012).*

(Continued)

*Primary Examiner* — Michael J Huntley
*Assistant Examiner* — Sehwan Kim
(74) *Attorney, Agent, or Firm* — Lathrop GPM LLP (57) ABSTRACT

A method including training, using training data including a first ontological hierarchical level, trained machine learning models (MLMs) to predict a first output type including a second ontological hierarchical level different than the first ontological hierarchical level. The method also includes generating instances of the first output type by executing the trained MLMs on unknown data including the first ontological hierarchical level. Outputs of the trained MLMs include the instances at the second ontological hierarchical level. The method also includes training, using the instances, a voting classifier MLM to predict a selected instance from the instances. The voting classifier MLM is trained to predict the selected instance to satisfy a criterion including a third ontological hierarchical level different than the first ontological hierarchal level and the second ontological hierarchical level.

14 Claims, 6 Drawing Sheets

(56) References Cited

OTHER PUBLICATIONS

Balakrishnan, Raju, and Rajesh Parekh. "Learning to predict subject-line opens for large-scale email marketing." 2014 IEEE International Conference on Big Data (Big Data). IEEE, 2014. (Year: 2014).*

El-Kenawy, El-Sayed M., et al. "Novel feature selection and voting classifier algorithms for COVID-19 classification in CT images." IEEE access 8 (2020): 179317-179335. (Year: 2020).*

Storn, Rainer, and Kenneth Price. "Differential evolution—a simple and efficient heuristic for global optimization over continuous spaces." Journal of global optimization 11.4 (1997): 341-359. (Year: 1997).*

* cited by examiner

CROSS-HIERARCHICAL MACHINE LEARNING PREDICTION

BACKGROUND

Machine learning models are computer algorithms that may be used to find hidden patterns in data. Machine learning models are more accurate when drawing on larger sets of data. However, data sets of sufficiently large quantities may not be available in order to enable a machine learning model to predict a quantity or classification of interest.

In some cases, a sufficiently large data set may be available, but the available data set is only indirectly related to the type of output desired. Thus, a technical challenge exists with respect to enabling machine learning prediction using input data that is only indirectly related to the type of output desired.

SUMMARY

The one or more embodiments provide for a method. The method includes training, using training data including a first ontological hierarchical level, trained machine learning models (MLMs) to predict a first output type including a second ontological hierarchical level different than the first ontological hierarchical level. The method also includes generating instances of the first output type by executing the trained MLMs on unknown data including the first ontological hierarchical level. Outputs of the trained MLMs include the instances at the second ontological hierarchical level. The method also includes training, using the instances, a voting classifier MLM to predict a selected instance from the instances. The voting classifier MLM is trained to predict the selected instance to satisfy a criterion including a third ontological hierarchical level different than the first ontological hierarchal level and the second ontological hierarchical level.

The one or more embodiments provide for another method. The method includes generating instances of a first output type by executing trained machine learning models (MLMs) on unknown data including a first ontological hierarchical level. Outputs of the trained MLMs include the instances. The instances include a second ontological hierarchical level different than the first ontological hierarchical level. The method also includes providing, as input, the instances to a voting classifier MLM. The method also includes predicting, by executing the voting classifier MLM, a selected instance from the instances. The voting classifier MLM is trained to predict the selected instance to satisfy a criterion including a third ontological hierarchical level different than the first ontological hierarchal level and the second ontological hierarchical level. The method also includes returning the selected instance.

The one or more embodiments also provide for a system. The system includes a processor and a data repository in communication with the processor. The data repository stores unknown data including a first ontological hierarchical level. The data repository also stores instances of a first output type including a second ontological hierarchical level different than the first ontological hierarchical level. The data repository also stores a selected instance from among the instances. The data repository also stores a criterion including a third ontological hierarchical level different than the first ontological hierarchical level and the second ontological hierarchical level. The system also includes an ensemble including trained machine learning models (MLMs) executable by the processor. The trained MLMs are configured to take, as input, the unknown data. The trained MLMs are configured to generate, as output, the instances. The system also includes a voting classifier MLM executable by the processor. The voting classifier MLM is configured to take, as input, the instances. The voting classifier MLM is configured to generate, as output, the selected instance that satisfies the criterion.

Other aspects will be apparent from the following description and the appended claims.

BRIEF DESCRIPTION OF DRAWINGS

Like elements in the various figures are denoted by like reference numerals for consistency.

DETAILED DESCRIPTION

In general, the one or more embodiments are directed to cross-hierarchical machine learning prediction. In particular, the one or more embodiments are directed to a system of machine learning models which, when operating in cooperation with each other as described below, are able to draw upon input data that, ontologically speaking, is only indirectly related to the ontological type of a desired output. In other words, while the available input data may not describe or directly relate to the information type of interest, the one or more embodiments nevertheless may allow a desirably accurate prediction or classification of an indirectly related type of data that is of interest.

Figure 2:
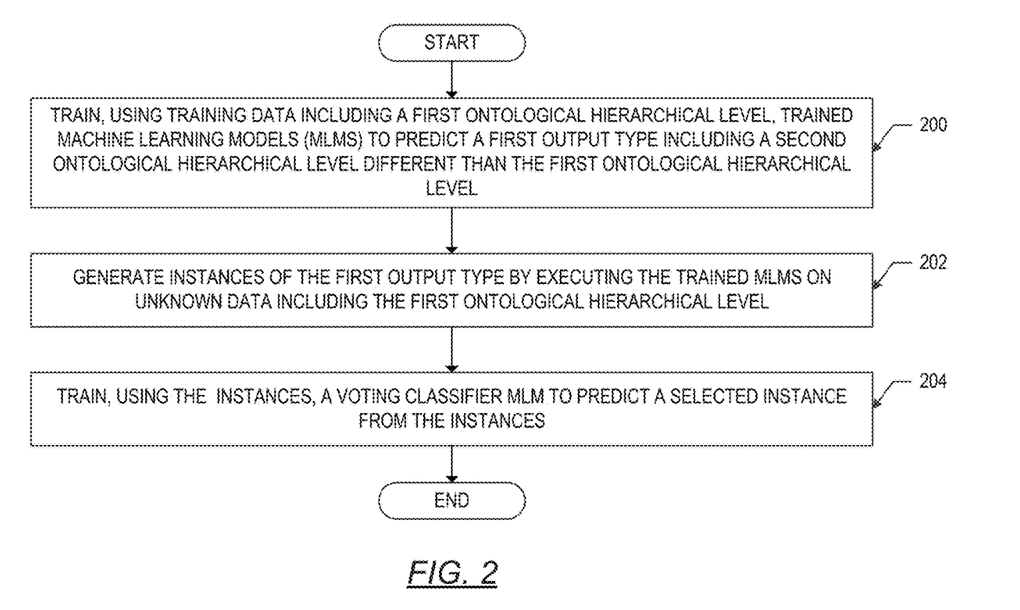
FIG. 2 and FIG. 3 show flowcharts of methods, in accordance with one or more embodiments.
Figure 3:
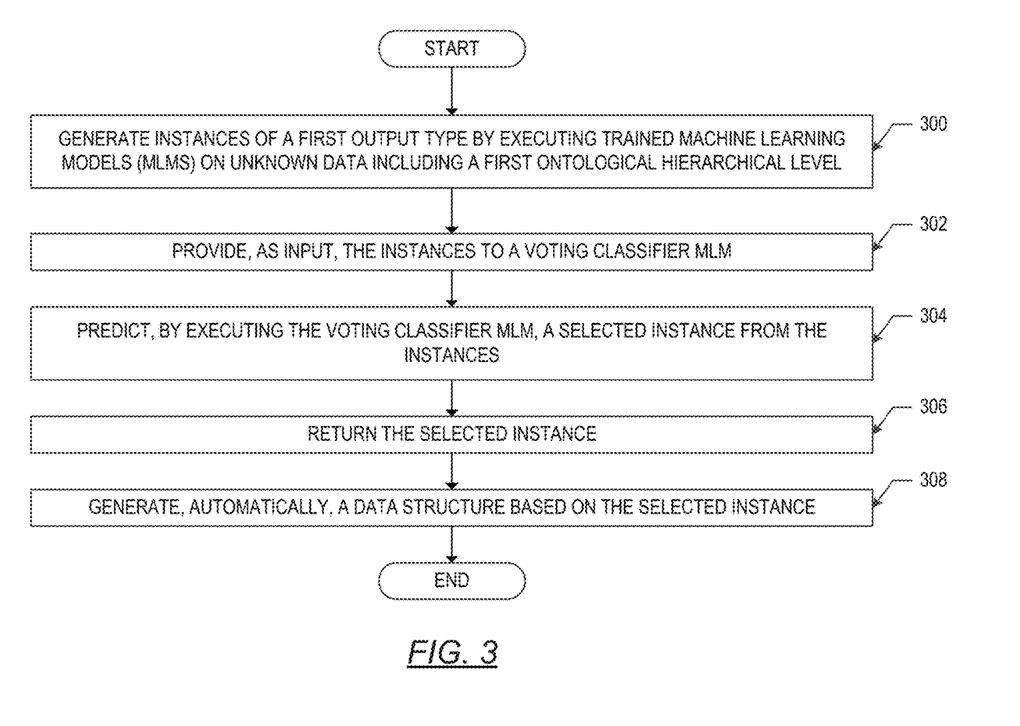

In summary, the one or more embodiments may be characterized as two overall steps, with the first overall step shown in FIG. 2 and the second overall step shown in FIG. 3. The first overall step (FIG. 2) is to train a learner (i.e., an ensemble of machine learning model) which creates predictions on a first, ontologically lower level (e.g., an invoice level in the example of FIG. 4). The learner may include one or multiple estimators (i.e., models), depending on the desired model architecture. The second overall step (FIG. 3) uses a voting classifier machine learning model to count, for all predictions made on the first, ontologically lower level (e.g. the invoice level in the example of FIG. 4) and make a decision for the second, ontologically higher level (e.g., the company level in the example of FIG. 4).

Figure 4A:
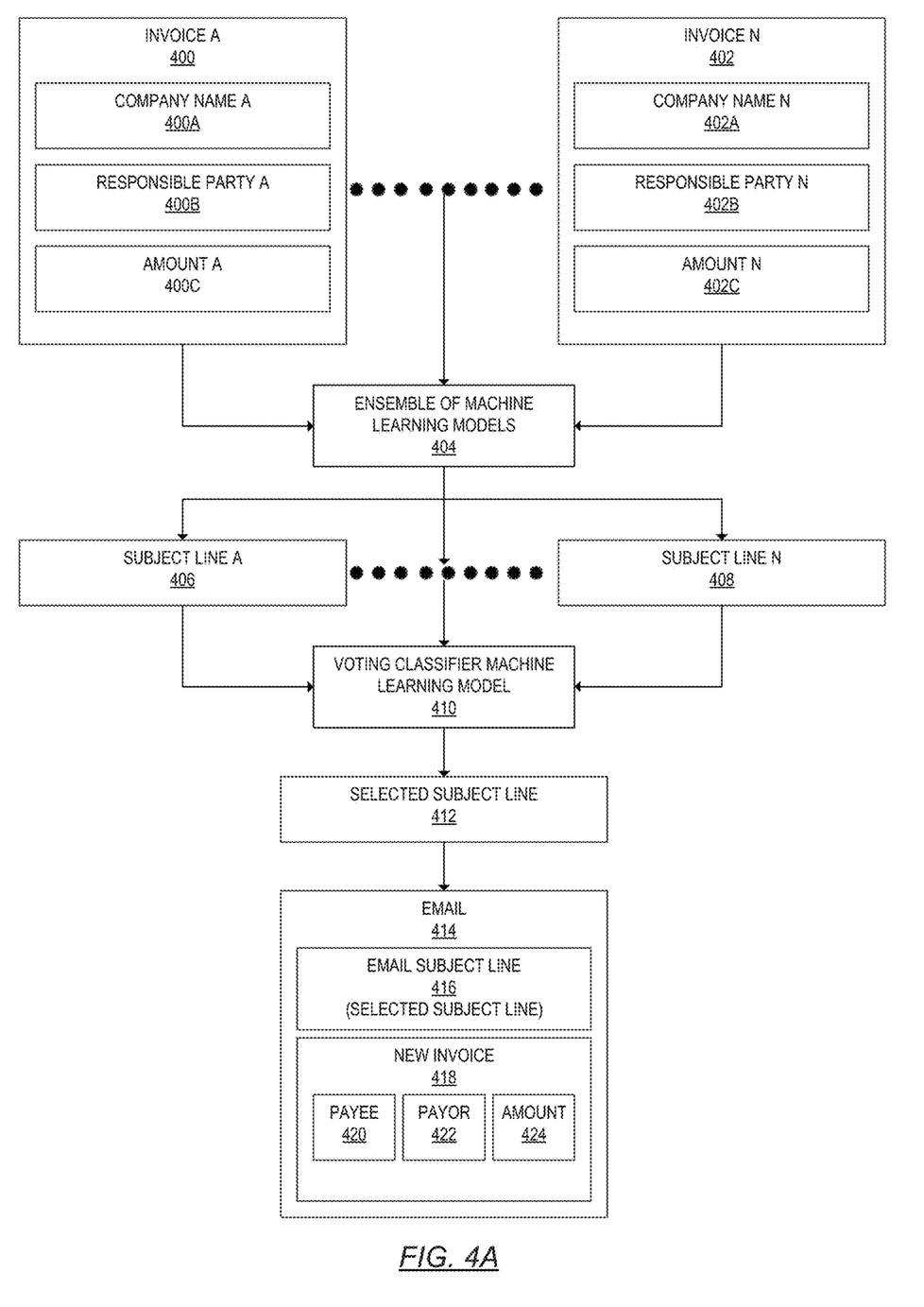
FIG. 4A and FIG. 4B show an example, in accordance with one or more embodiments.
Figure 4B:
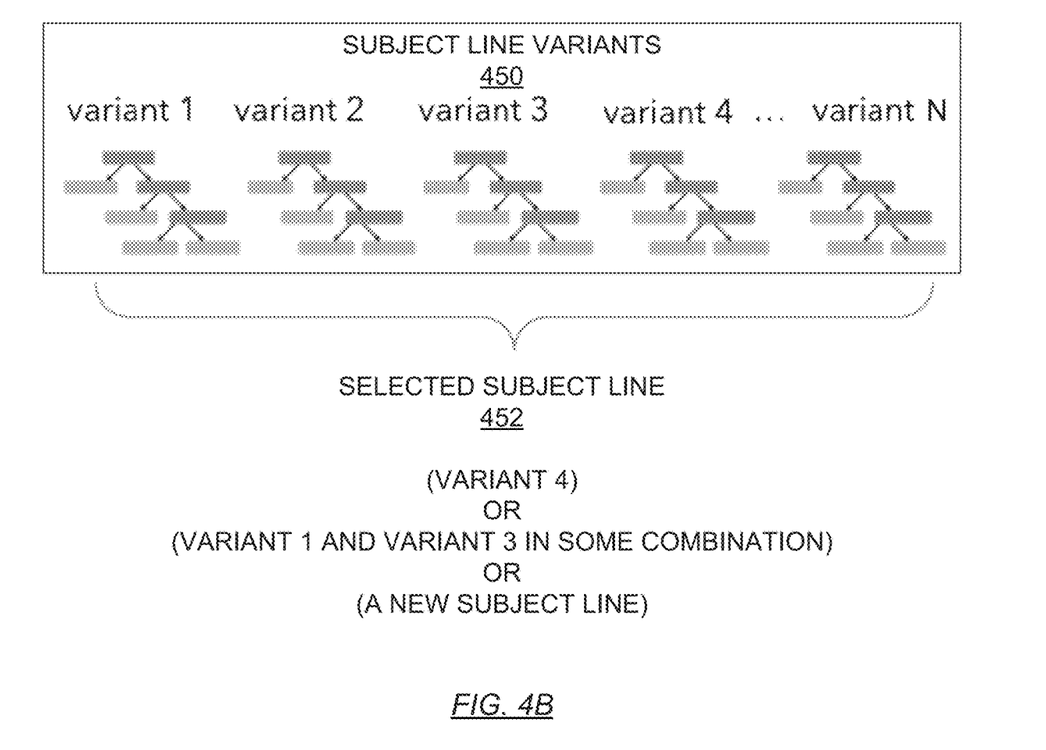

For example, as shown in FIG. 4A and FIG. 4B, a large dataset of past invoices may be available to a company that manages and operates financial management software available to millions of users. However, the information of interest may be subject lines to be used in emails that a given user may send to a given customer when transmitting a new invoice. Of specific interest is the wording of the email subject line which may increase the probability that the recipient of the email will act upon receipt of the email and pay the invoice. However, subject lines for emails are an information type that is ontologically only indirectly related to the information types contained in the dataset of invoices. In the example, email subject lines used in the past may not be available or may be insufficient in quantity for a machine learning model to predict directly which email subject lines will be most likely to prompt a specific recipient to act in response to an email sent by a specific business.

Without the one or more embodiments, it is extremely challenging for a machine learning model to predict, from the past invoices, a subject line that increases the probability that a recipient will act upon the email. However, the one or more embodiments enable an ensemble of machine learning models that can accurately generate sample email subject lines, and then select the best predicted email subject line for a given user to be sent to a specific customer.

The example above is only presented to highlight one possible use of the one or more embodiments. The one or more embodiments may also be applied in many other contexts where a large data set is available, but only ontologically indirectly related to the output of interest. The advancement in machine learning model training and usage represented by the one or more embodiments also may have applications in fields such as scientific research, medical testing, image analysis, and many other types of data analysis.

In other words, the one or more embodiments described with respect to FIG. 1 through FIG. 3 represent a technical solution to a technical problem in computer science. The technical problem is, as stated above, enabling machine learning algorithms to make predictions or generate outputs that are ontologically indirectly related to the available data set. The technical solution is an ensemble of machine learning models, trained and operated as described below.

Figure 1A:
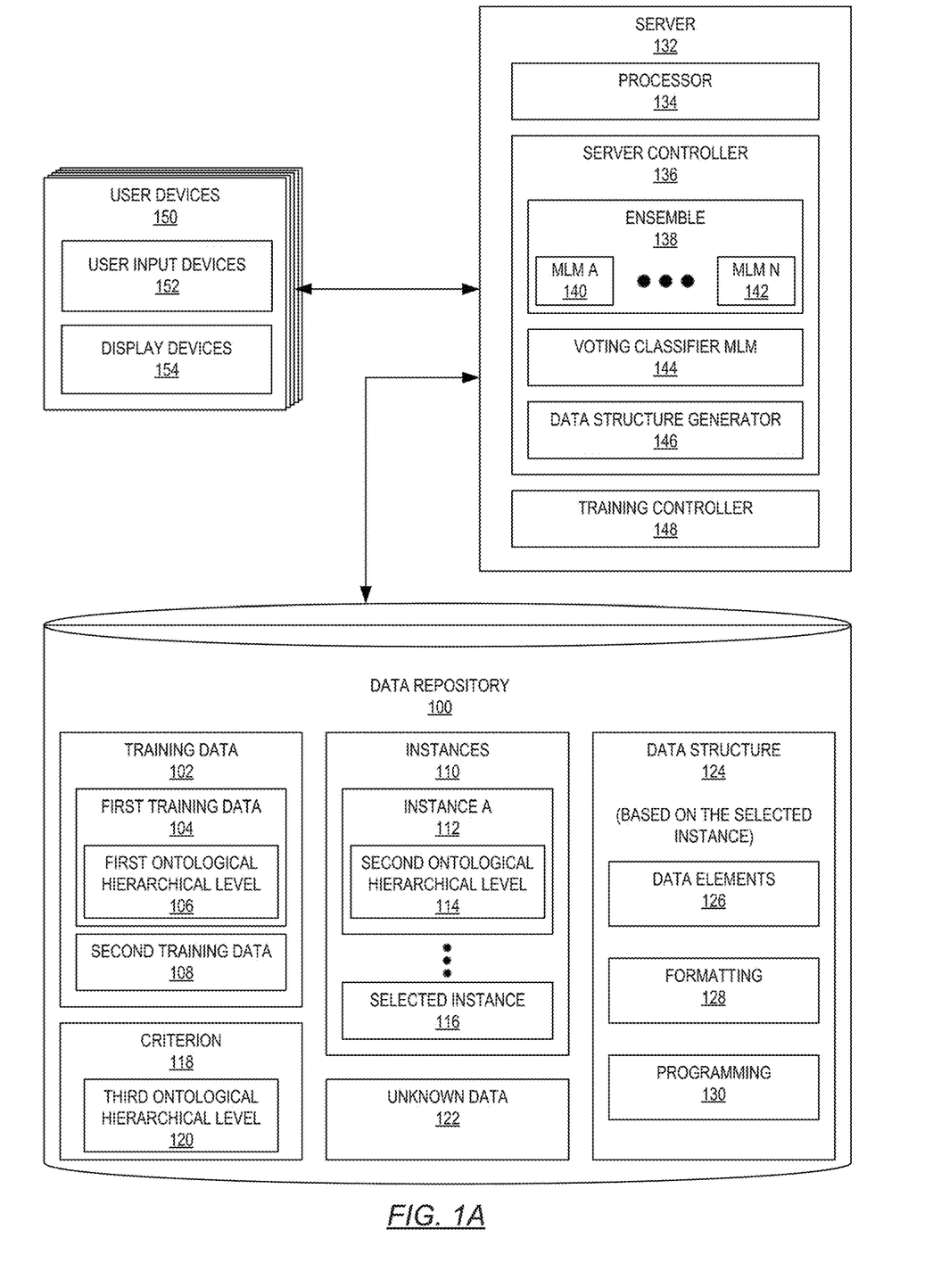
FIG. 1A and FIG. 1B show a computing system, in accordance with one or more embodiments.
Figure 1B:
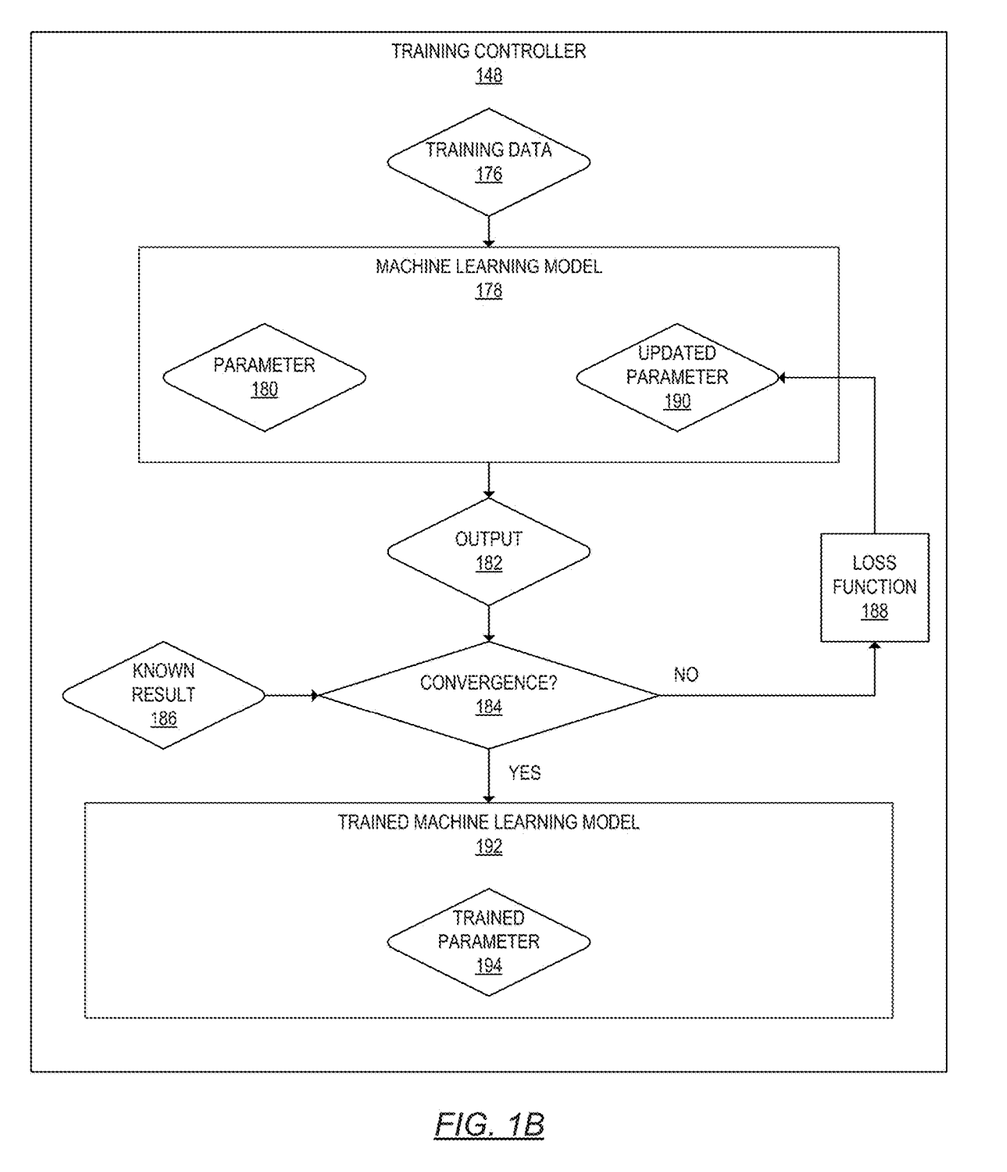

Attention is first turned to FIG. 1A and FIG. 1B. FIG. 1A shows an overall computing system, in accordance with one or more embodiments. FIG. 1B shows the training controller defined with respect to FIG. 1A and FIG. 1B.

Turning to FIG. 1A, the system includes a data repository (100). The data repository (100) is any type of storage unit and/or device (e.g., a file system, database, data structure, or any other storage mechanism) for storing data. Further, the data repository (100) may include multiple different, potentially heterogeneous, storage units and/or devices. The data repository (100) is a non-transitory computer readable storage medium.

The data repository (100) stores training data (102). The training data (102) is data for which a desired output prediction of one or more machine learning models is known. Training data is used to train a machine learning model, as described with respect to FIG. 1B.

For example, the training data (102) may be a corpus of invoices, where the invoices that were paid is known. In another example, the training data (102) may be a set of medical information of anonymized patients, where the diagnoses of the patients are already known.

The training data (102) may be characterized as having an ontological hierarchical level. For example, the training data (102) may include first training data (104), which is a subset or possibly all of the training data (102). The first training data (104) has a first ontological hierarchical level (106).

The term "ontological" is an adjective meaning "showing the relationships between concepts and categories in a subject area or domain." The term "hierarchical" is an adjective meaning "arranged in an order of rank." Thus, the term "ontological hierarchical" refers to the ranking of relationships between concepts and categories in multiple subject areas or domains. The term "level" refers to the position of a given set of data within the ranking.

With respect to the one or more embodiments, the lower the ontological hierarchical level assigned to a data set, the more distantly related that data set is from the information of interest, from an ontological perspective. Thus, the term "first ontological hierarchical level (106)" refers to data that is ontologically more distant to the information of interest, relative to some other data set (e.g., the second ontological hierarchical level (114) and the third ontological hierarchical level (120) described below) which is ontologically closer to the information of interest.

For example, referring to FIG. 4A and FIG. 4B for additional details, the first training data (104) may be past invoices for which payment history is known. However, the data or output of interest is the subject lines of emails. Thus, the invoices are at a "first ontological hierarchical level" and the subject lines of emails are at a "second ontological hierarchical level." To some, the ontological concept of email subject lines is relatively unrelated to the ontological concept of past invoices. Thus, the two types of data are at two different ontological hierarchical levels, the second ontological hierarchical level being closer to the desired information. Because the invoice data is ontologically farther from the desired information, the invoice data is designated as being at the first ontological hierarchical level (106). Because the subject lines of emails are at or closer to the desired information, the subject lines of emails are designated as being at the second ontological hierarchical level (114).

In other words, the second ontological hierarchical level (114) is ontologically closer to the information of interest. The first ontological hierarchical level (106) is ontologically farther from the information of interest.

Accordingly, in the one or more embodiments, the first training data (104) includes at least some training data that is at the first ontological hierarchical level (106). However, the data of interest is at a second, or higher, ontological hierarchical level. As described below, the server controller (136) may be used to execute the method of FIG. 2 to train machine learning models in order to execute the method of FIG. 3. In turn, the method of FIG. 3 describes the use of a trained machine learning ensemble to predict information at the second ontological hierarchical level (114) from unknown data that is at the first ontological hierarchical level (106).

In some cases, the first training data (104) may include information at different ontological hierarchical levels. Thus, for example, the second training data (108) is a portion of the first training data (104) that is at the second ontological hierarchical level (114). In some embodiments, the second training data (108) is generated from the first training data (104) at the first ontological hierarchical level (106), as described with respect to FIG. 2 and as mentioned with respect to the instances (110), below.

The instances (110) are candidate examples of information at the second ontological hierarchical level (114) that have been generated from data (either the training data (102) or the unknown data (122)) at the first ontological hierarchical level (106). Referring to the example of FIG. 4A and FIG. 4B, the instances (110) may be sample email subject lines generated or predicted from the data at the first ontological hierarchical level (106). The sample email subject lines are at the second ontological hierarchical level (114).

The instances (110) include multiple instances. Thus, the instances (110) include instance A (112), among possibly many other instances, that are at the second ontological hierarchical level (114).

Among the instances (110) is a selected instance (116). The selected instance (116) is the instance from the instances (110) that is selected for use. In other words, the selected instance (116) is the specific instance that is deemed or predicted to be most desirable based on the output of the machine learning model ensemble. Continuing the above example, the selected instance (116) may be a specific email subject line predicted to increase the probability that a recipient will pay an invoice attached to or referenced in the email.

The one or more embodiments are not limited to using the machine learning model ensemble to make predictions between just two ontological hierarchical levels. The one or more embodiments contemplate multiple sets of ensembles (e.g., an ensemble of ensembles) that may make predictions based on more distantly ontologically related data. Thus, there may exist a third ontological hierarchical level (120) of information more distantly related to the first ontological hierarchical level (106) relative to the second ontological hierarchical level (114).

For example, a criterion (118) may be at a third ontological hierarchical level (120). The criterion (118) is a benchmark for evaluating whether a data set meets a pre-determined standard. For example, the selected instance (116) may be selected because the selected instance (116) satisfies the criterion (118).

In a more specific example, the criterion (118) is a maximum probability of payment, among multiple probabilities of payment of invoices sent using different email subject lines. The probability of payment is at the third ontological hierarchical level (120) because the probability of payment is ontologically distinct from the instance (that is at the second ontological hierarchical level (114)). Additionally, the probability of payment is at the third ontological hierarchical level (120) because the probability of payment is more ontologically distant from the invoices (at the first ontological hierarchical level (106)), relative to the email subject lines (at the second ontological hierarchical level (114)).

In some embodiments, the criterion (118) may be relatively simple. For example, the criterion (118) may be to compare known relative payment rates of the instances (110) of email subject lines.

However, the criterion (118) may not be straightforward. For example, the patterns of payment may be hidden in the underlying data or may be known only from a different data set that is indirectly correlated to the invoices. In this case, the criterion (118) may be evaluated using the machine learning model described below using the methods of FIG. 3 in order to predict which of the instances (110) should be the selected instance (116).

The data repository (100) may also store unknown data (122). The unknown data (122) is data for which the desired prediction is unknown. For example, the unknown data (122) may be a set of invoices for which the desired result is not known. In some cases, the unknown data (122) may be the training data (102) itself, but the unknown data (122) becomes the unknown data (122) when making predictions at the second ontological hierarchical level (114) or third ontological hierarchical level (120). In any case, the unknown data (122) is data that is fed as input to the ensemble (138) defined below and processed according to the method of FIG. 3.

The data repository (100) may also store a data structure (124). The data structure (124) is a collection of data values, the relationships among the data values, and the functions or operations that can be applied to the data values. For example, the data structure (124) may be a string of characters (e.g. a series of words, numbers, or special characters), a matrix, a graph database, etc. The data structure (124) may be one of the instances (110). In a more specific example, referencing FIG. 4A and FIG. 4B, the data structure (124) may be one of the email subject lines (and the email subject lines are examples of the instances (110)).

However, the data structure (124) may take other forms. For example, the data structure (124) may be some data object, or collection of data objects, that together form a greater data structure that is automatically generated. For example, the data structure (124) may be an email generated for an invoice created by a user of financial management software. A suggestion is automatically made that the subject line of the email is the selected instance (116). Thus, the data structure (124) in this example is "based on" the selected instance (116).

The data structure (124) may include one or more data elements (126). A data element is a collection of data that together define some aspect of the data structure (124). Continuing the above example, the data structure (124) is an email, one of the data elements (126) may include a subject line of the email, and another one of the data elements (126) may be the invoice. Taken together, the collection of the data elements (126) form the substance of the data structure (124).

The data structure (124) may also be subjected to formatting (128). The formatting (128) is computer code that defines the appearance of the data elements (126) and how the data elements (126) should be arranged. For example, HTML code may be used to arrange the formatting and appearance of the data elements (126) that form a Web page.

The data structure (124) may also include programming (130). The programming (130) is computer code that is executable to perform a function. For example, the data structure (124) may be an email with a link. When the link is actuated, programming in the data structure (124) commands a Web browser to access a payment site where the recipient of the email can pay an invoice present in the email. Many different types of programming (130) are possible within the data structure (124).

The data repository (100) shown in FIG. 1 may be in communication with other components. For example, the data repository (100) may be in communication with a server (132). The server (132) is one or more computing devices, possibly operating in a distributed computing environment. The server (132) may include a processor (134), which is hardware and/or software (e.g., a virtual machine) that is capable of executing computer code, such as the server controller (136) and the training controller (148) described below. An example of the server (132) and the processor (134) are described with respect to FIG. 5A and FIG. 5B.

The server (132) may include a server controller (136). The server controller (136) is software or application specific hardware that, when executed by the processor (134), performs various functions as described with respect to FIG. 2 and FIG. 3.

The server controller (136) includes an ensemble (138). The ensemble (138) is two or more machine learning models, such as MLM A (140) through MLM N (142). The machine learning models may be a variety of different types, such supervised machine learning models, unsupervised machine learning models, or others. Specific types of machine learning models may include matrix factorization, contextual bandits, neural networks, etc.

Each of the machine learning models may also predict one of the instances (110) at the second ontological hierarchical level (114) from the unknown data (122) at the first ontological hierarchical level (106). Each of the machine learning models may also predict a payment rate correlated to known instances of existing examples of the second training data (108) (e.g. known subject lines associated with known invoices).

Thus, in one example, one or more of the machine learning models of the ensemble (138) takes, as input, the unknown data (122) and generates, as output, the instances (110). In another example, one or more of the machine learning models of the ensemble (138) may take, as input, the unknown data (122) and generate, as output, information at the third ontological hierarchical level (120).

The server controller (136) may also include a voting classifier MLM (144). The term "MLM" refers to a "machine learning model." Thus, the voting classifier MLM (144) is a type of machine learning model known as a voting classifier. The voting classifier MLM (144) is programmed to aggregate the predictions of the machine learning models in the ensemble (138) and predict the class with the most votes. In other words, the voting classifier MLM (144) may take, as input, the outputs of the machine learning models of the ensemble (138). Thus, the voting classifier MLM (144) takes, as input, the instances (110). The voting classifier MLM (144) then generates, as output, which of the instances (110) best satisfies the criterion (118) at the third ontological hierarchical level (120). An example of this process is described with respect to FIG. 4A and FIG. 4B.

The server controller (136) may also include a data structure generator (146). The data structure generator (146) is software or application specific hardware programmed to generate the data structure (124). The server controller (136) may take, as input, the output of the voting classifier MLM (144) (i.e., the selected instance (116)) and generate the data structure (124) based on or using the instances (110). Again, an example of this process is described with respect to FIG. 4A and FIG. 4B.

The server (132) may also include a training controller (148). The training controller (148) is software or application specific hardware configured to train the machine learning models of the ensemble (138) or the voting classifier MLM (144). An example of the training controller (148) is shown in FIG. 1B. An example of the use of the training controller (148) is shown with respect to FIG. 2.

The system shown in FIG. 1 may include other components. For example, the system may also include one or more user devices (150) in communication with the server (132). The user devices (150) are computing devices. Thus, for example, a data scientist or technician may use one or more the user devices (150) to interact with the server (132) in order to manipulate or manage the training controller (148) or the server controller (136).

However, the user devices (150) may also include end-user devices. An end-user may be, for example, an employee of a business that uses financial management software offered by the company that controls the server (132). The data structure (124) generated as described below may, for example, be provided to the employee as a means of automatically generating an invoice having the selected instance (116) (i.e., the email subject correlated with the greatest probability of the email recipient responding to the invoice and paying the invoice).

The user devices (150) may include user input devices (152). The user input devices (152) keyboards, mice, microphones, cameras, etc. which a user may use to interact with the user devices (150).

The user devices (150) may also include display devices (154). The display devices (154) are screens, monitors, televisions, etc. which a user may use to interact with the user devices (150).

Attention is turned to FIG. 1B, which shows the details of the training controller (148). The training controller (148) is a training algorithm, implemented as software or application specific hardware, that may be used to train one or more of the machine learning models described with respect to FIG. 1A, including the ensemble (138) and the voting classifier MLM (144).

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (192)) is applied to the unknown data (122) of FIG. 1A in order to make predictions.

In more detail, training starts with training data (176), which may be the training data (102) described with respect to FIG. 1A (with respect to the ensemble (138)) or the instances (110) (with respect to the voting classifier MLM (144)). The training data (176) is data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output that the machine learning model (178) has been programmed to output.

The output (182) is provided to a convergence process (184). The convergence process (184) compares the output (182) to a known result (186). A determination is made whether the output (182) matches the known result (186) to a pre-determined degree. The pre-determined degree may be an exact match, a match within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program that adjusts the parameter (180) in order to generate an updated parameter (190). The basis for performing the adjustment is defined by the program that makes up the loss function (188). For example, the basis may be a scheme that attempts to guess how the parameter (180) may be changed so that the next execution of the machine learning model (178) using the training data (176) with the updated parameter (190) will have an output (182) that more closely matches the known result (186).

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continue to iterate until convergence.

Upon convergence (a "yes" result at the convergence process (184)), the machine learning model (178) is deemed to be a trained machine learning model (192). The trained machine learning model (192) has a final parameter, represented by the trained parameter (194).

During deployment, the trained machine learning model (192) with the trained parameter (194) is executed again, but this time on the unknown data (122) of FIG. 1A for which the final result is not known. The output of the trained machine learning model (192) is then treated as a prediction of the information of interest relative to the unknown data.

While FIG. 1A and FIG. 1B shows a configuration of components, other configurations may be used without departing from the scope. For example, various components may be combined to create a single component. As another example, the functionality performed by a single component may be performed by two or more components.

FIG. 2 and FIG. 3 show flowcharts of methods, in accordance with one or more embodiments. FIG. 2 is a flowchart of a method of training an ensemble of machine learning models. FIG. 3 is a flowchart of a method for a specific example of using the ensemble of machine learning models.

As indicated above, the one or more embodiments may be characterized as two overall steps, with the first overall step shown in FIG. 2 and the second overall step shown in FIG. 3. The first overall step (FIG. 2) is to train a learner (i.e., an ensemble of machine learning models) which creates predictions on a first, ontologically lower level (e.g., an invoice level in the example of FIG. 4). The second overall step (FIG. 3) uses a voting classifier machine learning model to count, for all predictions made on the first, ontologically lower level (e.g. the invoice level in the example of FIG. 4) and make a decision for the second, ontologically higher level (e.g., the company level in the example of FIG. 4). However, in some embodiments, the learners (i.e. the ensemble of machine learning models operating on the ontologically lower level data) may have already been trained. Thus, the first overall step (FIG. 2) may be skipped in some embodiments.

Attention is first turned to FIG. 2. The method of FIG. 2 may be implemented using the system shown in FIG. 1A and FIG. 1B.

Step 200 includes training, using training data including a first ontological hierarchical level, trained machine learning models (MLMs) to predict a first output type including a second ontological hierarchical level different than the first ontological hierarchical level. Training the trained MLMs may be performed as described with respect to FIG. 1B. The training data, for example, may be the training data (102) of FIG. 1. The first ontological hierarchical level includes first data in a first domain. The second ontological hierarchical level includes second data in a second domain.

Each of the MLMs may be trained to predict a different instance. Thus, the result of the execution of the multiple MLMs is to generate many different instances. The predicted instances generated during training may be compared to the known instance during the convergence process. A loss function may then be generated to change the parameters of the various MLMs, and the process iterated until the MLMs are deemed to be trained.

Step 202 includes generating instances of the first output type by executing the trained MLMs on unknown data including the first ontological hierarchical level.

Outputs of the trained MLMs include the instances at the second ontological hierarchical level. Generating the instances, for example, may be performed by using natural language machine processing techniques to identify key phrases in the unknown data. If information of the second ontological hierarchal level is present in the unknown data, then that information also may be classified or compared to the criterion at the third ontological hierarchical level. The third ontological hierarchical level includes third data in a third domain.

Step 204 includes training, using the instances, a voting classifier MLM to predict a selected instance from the instances. The voting classifier MLM is trained to predict the selected instance to satisfy a criterion including a third ontological hierarchical level different than the first ontological hierarchal level and the second ontological hierarchical level.

The voting classifier MLM may aggregate the findings of each classifier in the ensemble executed at step 202, which serve as inputs to the voting classifier MLM. The voting classifier MLM predicts the output class based on the highest majority of voting. Thus, instead of creating separate dedicated models and finding the accuracy for each of them, the single voting classifier MLM may be used to train the ensemble of MLMs and predict an output based on their combined majority of voting for each output class.

The voting classifier MLM may use either hard voting or soft voting (i.e., the voting classifier MLM may a hard voting classifier MLM or may be a soft voting classifier MLM). In hard voting, the predicted output class is a class with the highest majority of votes (i.e., the class which had the highest probability of being predicted by each of the classifiers). Suppose three classifiers predicted the output class(A, A, B). The majority of classifiers predicted A as output. Hence A will be the final prediction.

In soft voting, the output class is the prediction based on the average probability given to that class. Suppose given some input to three models, the prediction probability for class A=(0.30, 0.47, 0.53) and B=(0.20, 0.32, 0.40). So the average for class A is 0.4333 and B is 0.3067. The winner is class A because class A had the highest probability averaged by each classifier.

Thus, when training the voting classifier MLM, the inputs are selected instances that are predicted. The known result is known to be the instance with the highest probability, picked by either hard voting or soft voting. If the prediction of the voting classifier MLM does not match the known result, then a loss function is generated to change a parameter of the voting classifier MLM. The process is iterated until convergence.

The method of FIG. 2 may be executed in many different data analysis techniques where information at a second ontological hierarchical level is desired, but only unknown data in a sufficiently large quantity is available at a first ontological hierarchical level. A specific example of the application of the machine learning models trained according to the method of FIG. 2 is shown in FIG. 4A and FIG. 4B.

Attention is now turned to FIG. 3. FIG. 3 is a flowchart of a method of using an ensemble of machine learning models trained according to the method shown in FIG. 2.

The method of FIG. 3 may be implemented using the system shown in FIG. 1A and FIG. 1B.

Step 300 includes generating instances of a first output type by executing trained machine learning models (MLMs) on unknown data including a first ontological hierarchical level. Thus, the inputs to the trained MLMs are the unknown data. Each of the different MLMs in the ensemble may receive the same input of unknown data. The outputs of the trained MLMs include the instances. The instances include a second ontological hierarchical level different than the first ontological hierarchical level.

Step 302 includes providing, as input, the instances to a voting classifier MLM. The input may be provided in the form of a vector. A vector is a data structure composed of features and values, sometimes arranged in the form of a 1×N matrix. Each feature represents a data value to be consumed by the MLM. A value is a number that represents a quantitative measure of the feature.

Step 302 may include, in some instances, the process of vectorization. Vectorization is the process of converting data in one data structure (other than a vector) into the vector data structure.

Step 304 includes predicting, by executing the voting classifier MLM, a selected instance from the instances. The voting classifier MLM is trained to predict the selected instance to satisfy a criterion including a third ontological hierarchical level different than the first ontological hierarchal level and the second ontological hierarchical level. Specifically, the voting classifier MLM may operate in the manner described above with respect to step 204 of FIG. 2. The output of the voting classifier MLM is the selected instance.

Step 306 includes returning the selected instance. Returning the selected instance may be performed by displaying the selected instance on a display screen or storing the selected instance in a non-transitory computer readable storage medium. Returning the selected instance may also include further passing the selected instance to some other process.

For example, optional step 308 may include generating, automatically, a data structure based on the selected instance. The data structure may be the ultimate product of interest, but the product of interest will use the selected instance. An example of step 308 is shown in FIG. 4B.

While the various steps in the flowcharts are presented and described sequentially, at least some of the steps may be executed in different orders, may be combined or omitted, and at least some of the steps may be executed in parallel. Furthermore, the steps may be performed actively or passively.

FIG. 4A and FIG. 4B provides an example of the one or more embodiments described with respect to FIG. 1A through FIG. 3. The following example is for explanatory purposes only and is not intended to limit the scope of the one or more embodiments.

The specific computer programming challenge described in FIG. 4A and FIG. 4B involves predicting subject lines for an email to be generated by a financial management application (FMA). The email will include an invoice generated by a specific user of the FMA. The email will be addressed to a customer of the user. Thus, in the example of FIG. 4A and FIG. 4B, the "user" is the business or person generating the invoice that will be transmitted via email. The "customer" is a business or person to whom the invoice is addressed.

It has been shown, statistically, that the wording of a subject line of an email that transmits an invoice is correlated to higher or lower payment rates of the invoices transmitted by email. In other words, some email subject lines may increase the probability of prompt payment, and others may decrease the probability of prompt payment. Thus, it is desired that an analytical approach be taken to predict, to the highest statistical accuracy possible, the wording of the subject line that maximizes the probability that the customer will pay the user based on the submitted invoice. Furthermore, it is desired that the statistical analysis be tailored to the specific user and the specific customer, if possible. If such specific customization of the predicted email subject line is not possible, then an analysis based on a more general population of data may be used.

The technical challenge, however, is that a sufficiently large corpus of subject lines of emails is not available. As indicated above, machine learning models are often not accurate predictors or classifiers, unless a sufficiently large amount of data is available. A computer scientist or technician is capable of determining how much data is considered "sufficiently large" for a given project, a given type of machine learning model, a desired level of accuracy, etc. As indicated above, a computer scientist or technician has determined that there is insufficient data of the desired ontological type to use a simple machine learning prediction of the subject line that is statically reliably classified as the "best" subject line.

Nevertheless, a large corpus of past invoices is available. Some subject lines of past emails may also be present. The payment history of the past invoices is also available.

However, the subject lines are too few in number for use in machine learning prediction. Furthermore, the invoices are at a first ontological hierarchical level, relative to the subject lines of past emails that are at a second ontological hierarchical level, and thus are also unsuitable for use in a simple machine learning classifier. The payment history is a third ontological hierarchical level, and thus also not suitable for use in a simple machine learning classifier, even in combination with the invoices, because neither information type relates directly to the subject lines of emails.

The system of FIG. 1 and the method of FIG. 3 may be used to solve the specific technical challenge described above. The specific application of the system of FIG. 1 and the method of FIG. 3 to the above specific scenario is shown in FIG. 4A.

The corpus of invoices is shown as many different invoices, from Invoice A (400) to Invoice N (402). Each invoice includes various information. For example, the Invoice A (400) includes company name A (400A), responsible party A (400B), and amount A (400C). Likewise, the Invoice N (402) includes company party N (402A), responsible party N (402B), and amount N (402C). The invoice may include more or fewer data. The invoices may include different data in some embodiments.

The corpus of invoices, from Invoice A (400) to Invoice N (402), are vectorized. The vector is then fed to each of the machine learning models in the ensemble of machine learning models (404). Each model predicts a different subject line as being the most likely to prompt a customer to pay the user.

The problem now becomes determining, statistically, which subject line actually is the most likely to prompt a customer to pay the user, either in the general sense (i.e. among users and customers generally) or specifically (i.e. for a specific invoice being generated by a specific user to be transmitted to a specific customer).

The problem may be visualized in FIG. 4B. Many subject line variants (450) have been proposed, or have been evaluated by different machine learning models as being the "best." In other words, each of variant 1 through variant N shown in FIG. 4B may be the "best," but it is not statistically reliable to pick a variant at random. Stated differently, from a statistical perspective, there is no way to know, without more, which machine learning model is the most accurate predictor and thus predicted the most accurate result.

Indeed, it is possible that none of the subject line variants in FIG. 4B are the "best," statistically speaking. It is possible that a new combination of words is the most likely to prompt a customer to pay a user when the customer receives the email containing the invoice.

However, the one or more embodiments also address this technical problem. The outputs of the ensemble of machine learning models (404), namely the subject line A (406) through the subject line N (408), are vectorized using natural language machine learning processing techniques such as word2vec, or others. The resulting vector or vectors are provided as input to the voting classifier machine learning model (410).

The output of the voting classifier machine learning model (410) is the selected subject line (412). In the case of a hard voting classifier machine learning model (410), the selected subject line (412) is the subject line that is the most accurate or is the highest predicted probability of payment of the invoice. In the case of a soft voting classifier machine learning model (410), the selected subject line (412) may be a weighted average of the various subject lines.

As a result, when the output of the voting classifier machine learning model (410) is converted back into natural language text, the selected subject line (412) may be different than any of the subject line A (406) through subject line N (408) predicted by the ensemble of machine learning models (404). For example, the selected subject line (412) may be a combination of words from two or more of the subject line A (406) through the subject line N (408), or may be a new ordering of words of one or more of the subject line A (406) through the subject line N (408).

Three different possibilities of the output of the voting classifier machine learning model (410) are shown in FIG. 4B. The selected subject line (452) of FIG. 4B may be variant 4 or may be variant 1 and variant 3 in some combination, or may be a new subject line that is predicted based on the words used in the subject line variants (450).

Returning to FIG. 4A, the output of the voting classifier machine learning model (410), namely the selected subject line (412), may be used to generate a new data structure. In other words, the data structure may be based on the selected subject line (412) (or may be said to be based on the output of the voting classifier machine learning model (410)).

In the example of FIG. 4A, the new data structure is an email (414). The email (414) includes an email subject line (416). The email subject line (416) is the selected subject line (412). Thus, it may be said that the email subject line (416) or the email (414) are based on the selected subject line (412) generated using the output of the voting classifier machine learning model (410).

The email (414) also includes a new invoice (418) that specifies a payee (420), a payor (422), and an amount (424). The payee (420), the payor (422), amount (424), and the formatting of the new invoice (418), along with the formatting of the email subject line (416) and other aspects of the email (414) may be automatically generated.

Thus, when the user desires to send an invoice to a customer, the user simply clicks on a widget to "generate a new invoice" and provides the inputs for the payee (420), the payor (422), or amount (424). The FMA generates the email, the email subject line (416), and the new invoice (418), along with the formatting for the shown components. The FMA possibly may indicate that while the user may change the email subject line (416), the email subject line (416) has been predicted to increase the probability that the recipient of the email will respond to the email (414) and pay the new invoice (418).

As used herein, a computer is an electronic device, not necessarily limited to a desktop computer or a server. Thus, a computer may be a mobile phone, a smart watch, a laptop computer, a desktop computer, a server computer, etc. A "computer" may also refer to multiple computers, possibly in a distributed computing or networked environment, and possibly acting in tandem. The terms "computer" and "computing system" may be used synonymously.

Figure 5A:
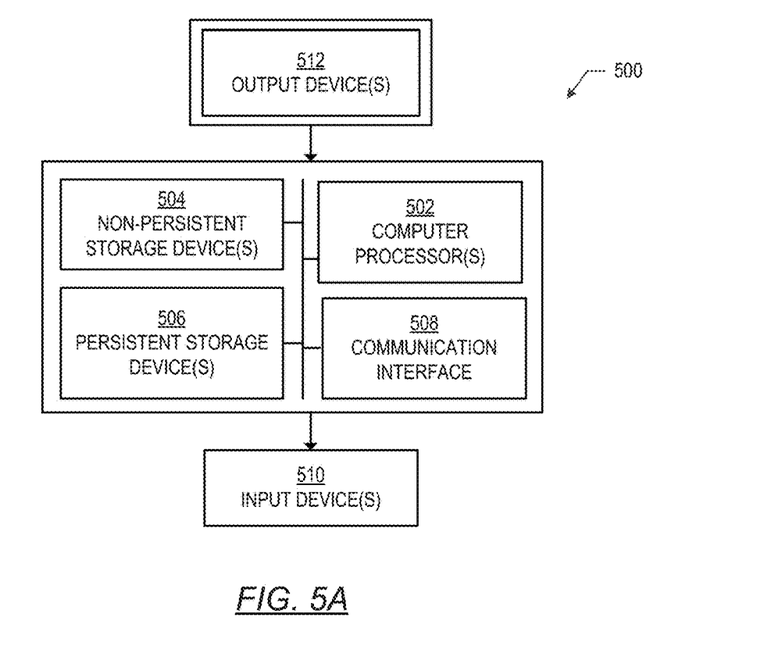
FIG. 5A and FIG. 5B show a computing system and network environment, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. For example, the computer processor(s) may be one or more cores or micro-cores of a processor. The input device(s) (510) may include a touchscreen, keyboard, mouse, microphone, touchpad, electronic pen, or any other type of input device. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output device(s) (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 5B:
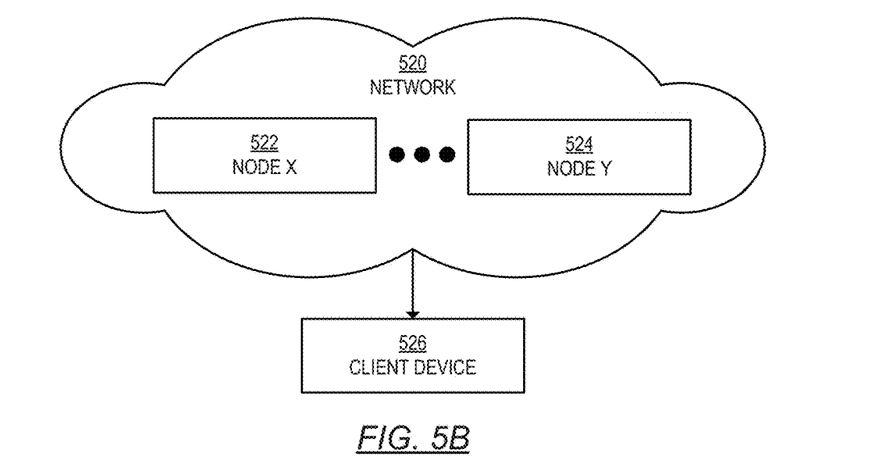

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; e.g., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities.

In the above description, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope as disclosed herein. Accordingly, the scope should be limited only by the attached claims.

What is claimed is:

1. A method comprising:
    training, using training data comprising a plurality of invoices at a first ontological hierarchical level, a plurality of trained machine learning models (MLMs) to predict a first output type, comprising a plurality of email subject lines, at a second ontological hierarchical level different than the first ontological hierarchical level,
        wherein the first ontological hierarchical level comprises first data that is ontologically more distant to an information of interest, relative to the second ontological hierarchical level,
        wherein the information of interest comprises the plurality of email subject lines when transmitted to users previously who received the plurality of invoices, and
        wherein the plurality of invoices are indirectly related to the plurality of email subject lines;
    generating the plurality of email subject lines by executing the plurality of trained MLMs on unknown data comprising a plurality of different invoices; and
    training, using the plurality of email subject lines, a soft voting classifier MLM to predict a selected email subject line from the plurality of email subject lines, wherein:
        the soft voting classifier MLM is trained to predict the selected email subject line to satisfy a criterion comprising a third ontological hierarchical level different than the first ontological hierarchical level and the second ontological hierarchical level,
        the third ontological hierarchical level comprises a payment history of the users with respect to the plurality of invoices,
        the second ontological hierarchical level comprises second data that is ontologically more distant to the information of interest, relative to the third ontological hierarchical level;
        the selected email subject line comprises a combination of the plurality of email subject lines, and the combination of the plurality of email subject lines is different than any individual one of the plurality of email subject lines.

2. The method of claim 1, wherein:
the criterion comprises a highest payment rate of the plurality of invoices, and
the highest payment rate corresponds to a selected email subject line from among the plurality of email subject lines.

3. The method of claim 1, wherein the soft voting classifier MLM comprises a hard majority vote classifier.

4. The method of claim 1, wherein the soft voting classifier MLM comprises a soft majority vote classifier.

5. The method of claim 1, wherein the plurality of trained MLMs are selected from a group consisting of: a supervised MLM, a matrix factorization MLM, a contextual bandits MLM, and a neural network MLM.

6. A method, comprising:
generating a plurality of email subject lines by executing a plurality of trained machine learning models (MLMs) on a plurality of invoices indirectly related to the plurality of email subject lines, the plurality of invoices comprising a first ontological hierarchical level, wherein:
the plurality of trained MLMs are trained to predict the plurality of email subject lines at a second ontological hierarchical level different than the first ontological hierarchical level,
the first ontological hierarchical level comprises first data that is ontologically more distant to an information of interest, relative to the second ontological hierarchical level, and
outputs of the plurality of trained MLMs comprise the plurality of email subject lines
providing, as input, the plurality of email subject lines to a soft voting classifier MLM, wherein:
the soft voting classifier MLM is trained to predict a selected email subject line to satisfy a criterion comprising a third ontological hierarchical level different than the first ontological hierarchical level and the second ontological hierarchical level,
the selected email subject line comprises a combination of the plurality of email subject lines, and
the second ontological hierarchical level comprises second data that is ontologically more distant to the information of interest, relative to the third ontological hierarchical level;
predicting, by executing the soft voting classifier MLM, the selected email subject line based on the plurality of email subject lines,
wherein:
the selected email subject line has the third ontological hierarchical level, and
the combination of the plurality of email subject lines is different than any individual one of the plurality of email subject lines; and
returning the selected email subject line.

7. The method of claim 6, further comprising:
generating, automatically, a data structure based on the selected email subject line.

8. The method of claim 6, wherein:
the criterion comprises a highest payment rate of the plurality of invoices, and
the highest payment rate corresponds to a selected email subject line from among the plurality of email subject lines.

9. The method of claim 6, further comprising:
generating, automatically, a data structure based on the selected email subject line, wherein the data structure comprises a new invoice having the selected email subject line.

10. A system comprising:
a processor;
a data repository in communication with the processor, the data repository storing:
a plurality of invoices comprising a first ontological hierarchical level,
a plurality of email subject lines comprising a second ontological hierarchical level different than the first ontological hierarchical level,
wherein the invoices of the first ontological hierarchical level is ontologically more distant to an information of interest, relative to the second ontological hierarchical level,
wherein the information of interest comprises the plurality of email subject lines when transmitted to users previously who received the plurality of invoices, and
wherein the plurality of invoices are indirectly related to the plurality of email subject lines,
a selected email subject line selected from the plurality of email subject lines, wherein the selected email subject line comprises a combination of the plurality of email subject lines, and
a criterion comprising a third ontological hierarchical level different than the first ontological hierarchical level and the second ontological hierarchical level, wherein:
the plurality of email subject lines are ontologically more distant to the information of interest, relative to the third ontological hierarchical level,
the selected email subject line has the third ontological hierarchical level, and
the third ontological hierarchical level comprises a payment history of the users with respect to the plurality of invoices;
an ensemble comprising a plurality of trained machine learning models (MLMs) executable by the processor, wherein:
the plurality of trained MLMs are trained to predict the plurality of email subject lines comprising the second ontological hierarchical level,
the plurality of trained MLMs are configured to take, as input, the invoices, and
the plurality of trained MLMs are configured to generate, as output, the plurality of email subject lines; and
a soft voting classifier MLM executable by the processor, wherein:
the soft voting classifier MLM is trained to predict the selected email subject line to satisfy the criterion comprising the third ontological hierarchical level,
the soft voting classifier MLM is configured to take, as input, the plurality of email subject lines, and
the soft voting classifier MLM is configured to generate, as output, the selected email subject line that satisfies the criterion, such that the combination of the plurality of email subject lines is different than any individual one of the plurality of email subject lines.

11. The system of claim 10, further comprising:
a training controller executable by the processor to train the ensemble using training data comprising the first ontological hierarchical level.

12. The system of claim 11, wherein the training controller is further executable by the processor to train the soft voting classifier MLM using second training data comprising the second ontological hierarchical level.

13. The system of claim 10, wherein the ensemble and the soft voting classifier MLM are executable by a server controller in communication with the processor.

14. The system of claim 10, further comprising:
a data structure generator in communication with the processor, wherein the data structure generator is configured to generate, automatically, a data structure using the selected email subject line, wherein the data structure comprises a new invoice having the selected email subject line.

\* \* \* \* \*